(12) United States Patent
Ledder et al.

(10) Patent No.: US 8,479,673 B1
(45) Date of Patent: Jul. 9, 2013

(54) VESSEL FOR RESEARCH AND DEVELOPMENT OF OFFSHORE RENEWABLE ENERGY RESOURCES

(75) Inventors: Mark S. Ledder, Fredericksburg, TX (US); Roger Fyffe, Sugar Land, TX (US)

(73) Assignee: Ledder High Risk Capital Ventures, LP, Fredericksburg, TX (US)

( * ) Notice: Subject to any disclaimer, the term of this patent is extended or adjusted under 35 U.S.C. 154(b) by 269 days.

(21) Appl. No.: 13/088,969

(22) Filed: Apr. 18, 2011

(51) Int. Cl.
| | |
|---|---|
| *B63B 1/06* | (2006.01) |
| *B63B 3/00* | (2006.01) |
| *B63B 3/38* | (2006.01) |
| *B63B 11/00* | (2006.01) |
| *B63B 29/00* | (2006.01) |
| *B63B 35/00* | (2006.01) |

(52) U.S. Cl.
USPC .......... 114/65 R; 114/56.1; 114/140; 114/151

(58) Field of Classification Search
USPC .................. 114/56.1, 65 R, 66, 71, 72, 126, 114/127, 140, 150, 151, 162, 163
See application file for complete search history.

(56) References Cited

U.S. PATENT DOCUMENTS

| | | | | | |
|---|---|---|---|---|---|
| 4,550,673 | A | * | 11/1985 | Ingvason | 114/61.28 |
| 6,536,272 | B1 | * | 3/2003 | Houston et al. | 73/170.29 |
| 7,712,426 | B1 | * | 5/2010 | Ledder et al. | 114/65 R |
| 2002/0069805 | A1 | * | 6/2002 | Nuss | 114/65 R |

FOREIGN PATENT DOCUMENTS

JP   2005199736 A  *  7/2005

* cited by examiner

*Primary Examiner* — Ajay Vasudeva
(74) *Attorney, Agent, or Firm* — Buskop Law Group, PC; Wendy Buskop

(57) ABSTRACT

The present embodiments relate to a vessel for oceanographic research and the development and maintenance of renewable energy resources. The vessel can have a hull, a keel with a keel cooler, skegs, watertight interior bulkheads, a main deck, topsides, insulation, sonar tubes, a sonar transducer, an engine room, a propulsion system, propellers and rudders that are operable independently and in tandem, engines with vibration isolation mounts, fuel tanks, a hydraulic bow thruster, generators, a pilothouse, a navigation station, a steering device, a dog house, living quarters, a communication system, lighting, escape hatches, and a knuckle boom crane. The hull can be adapted to sit level on a mudflat during a low tide, enabling crew to initiate emergency repairs to the vessel without having to return to port. The vessel can also have a dynamic positioning processor enabling for continuous vessel positioning.

19 Claims, 10 Drawing Sheets

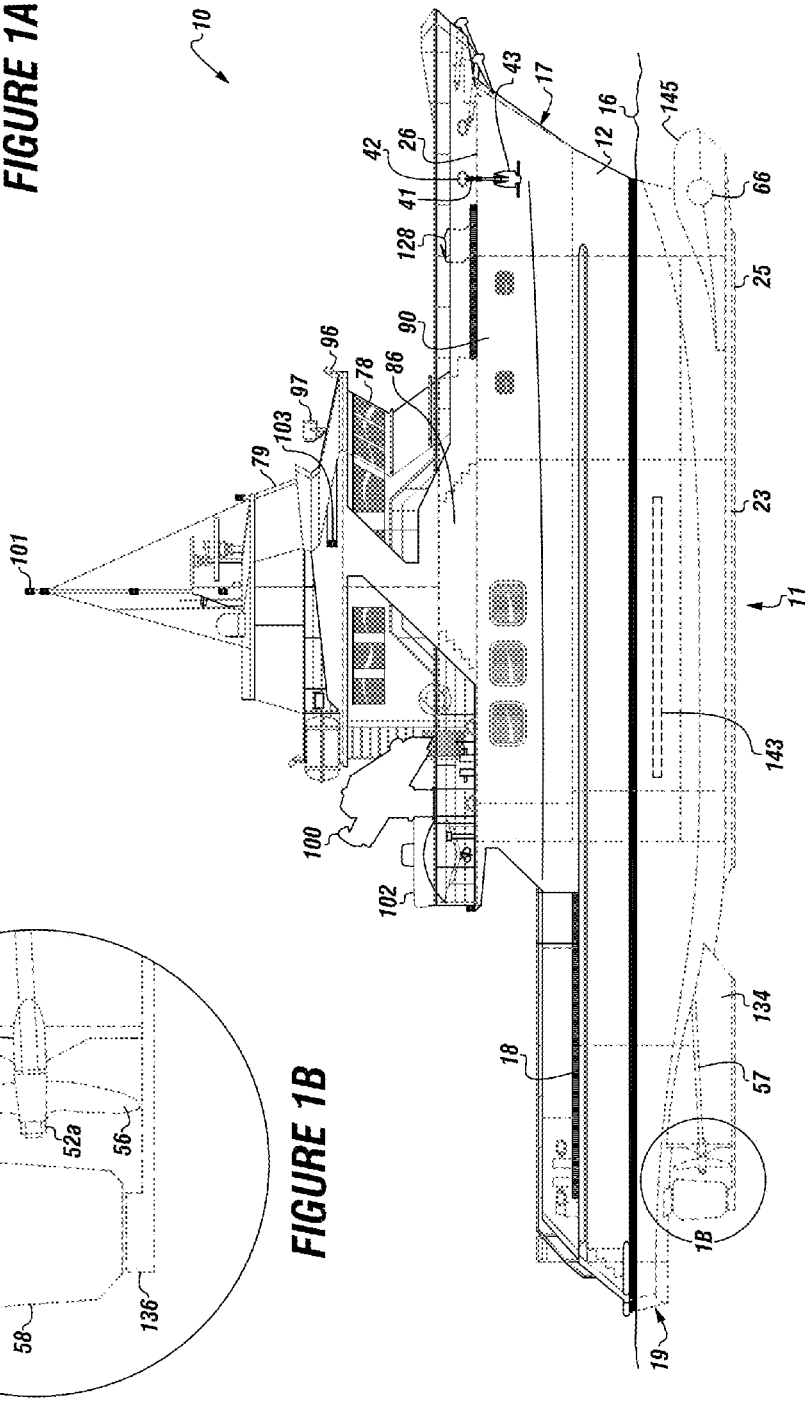
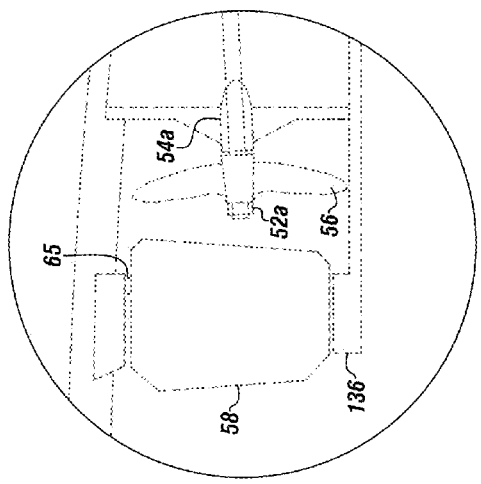

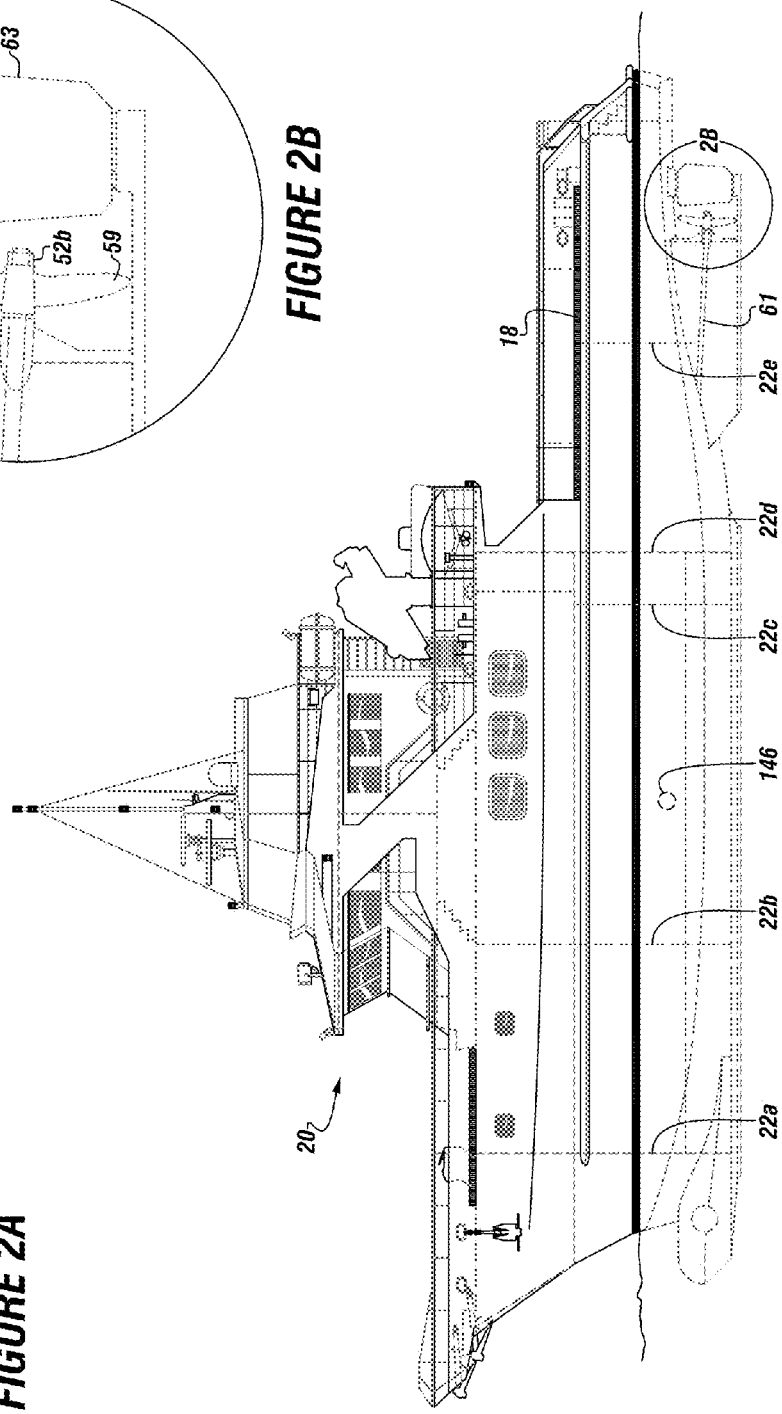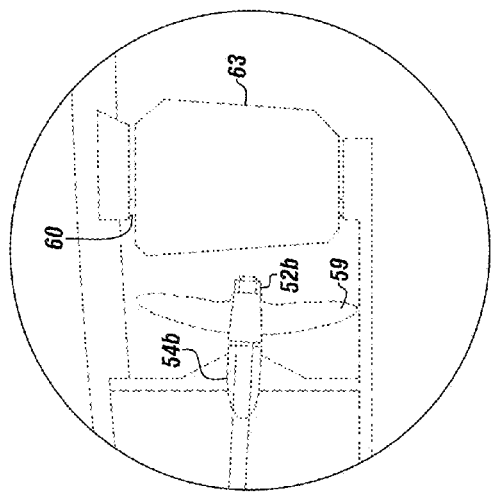

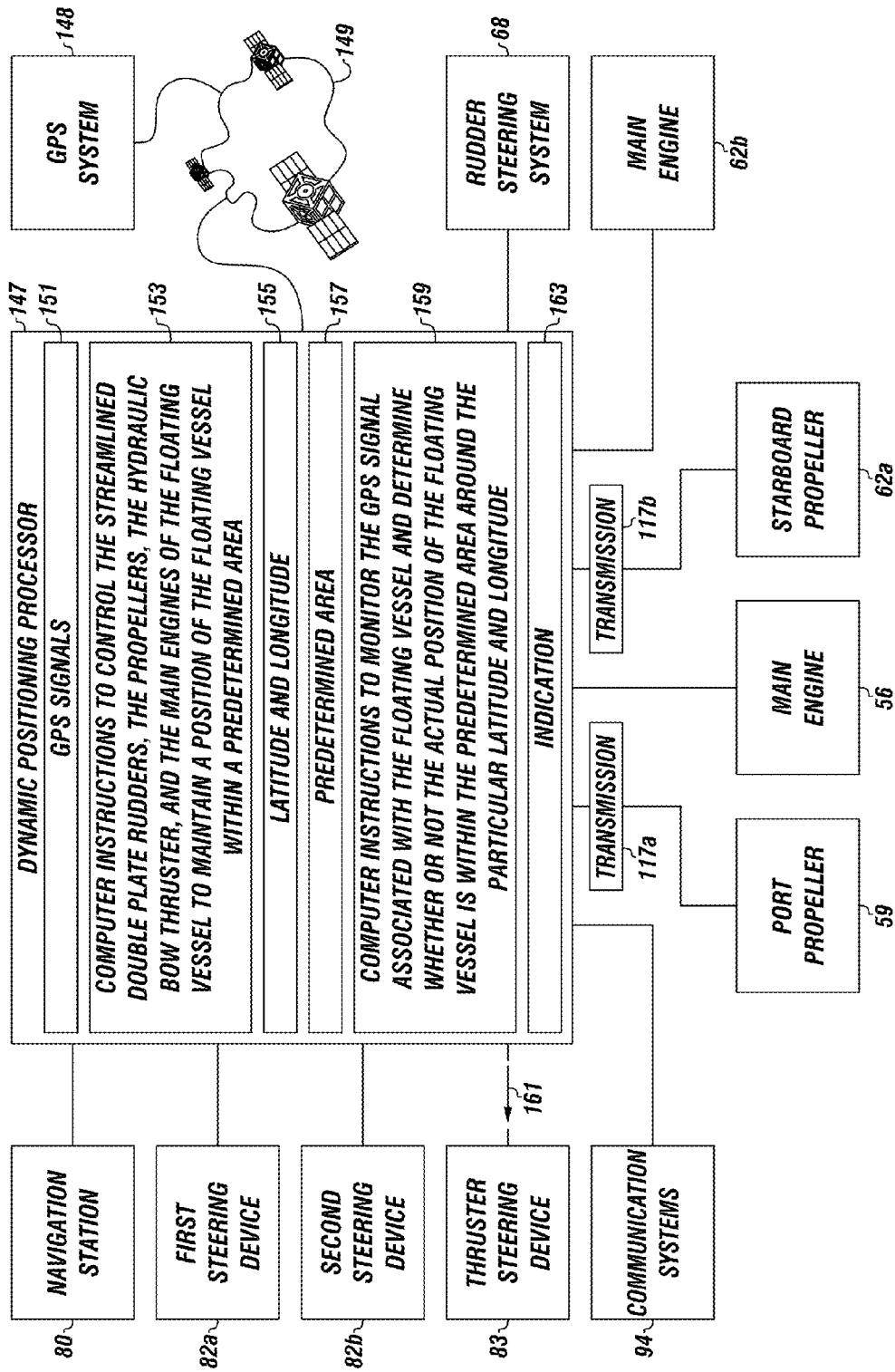

US 8,479,673 B1

VESSEL FOR RESEARCH AND DEVELOPMENT OF OFFSHORE RENEWABLE ENERGY RESOURCES

FIELD

The present embodiments generally relate to a floating vessel for oceanographic research, and for development, monitoring and maintenance of offshore renewable energy resources, such as offshore wind farms.

BACKGROUND

A need exists for an oceanographic research vessel that is able to assist in the development, monitoring, and maintenance of offshore renewable energy resources.

A need exists for a vessel configured for all-weather operation for oceanographic research, development, and maintenance of offshore renewable energy resources from arctic climates to tropical hurricane prone climates with less likelihood of sinking.

A further need exists for a vessel having dynamic positioning capabilities for independently maintaining a position using unique propellers and bow thrusters in communication with a dynamic positioning processor for oceanographic research and assisting in the building and maintaining of offshore renewable energy resources, such as floating buoys.

A need exists for a vessel for providing research and development having a main deck that is wide enough and strong enough to support at least two standard 20 foot containers from container vessels without deforming under load. Shipping containers are often used to ship and store sensitive equipment, such as chromatographs, building materials, pumps, piping, and tools.

The present embodiments meet all these needs.

BRIEF DESCRIPTION OF THE DRAWINGS

The detailed description will be better understood in conjunction with the accompanying drawings as follows:

FIGS. 1A-1B depict a starboard side view of the floating vessel according to one or more embodiments.

FIGS. 2A-2B depict a port side view of the floating vessel according to one or more embodiments.

FIG. 8 depicts an embodiment of a dynamic positioning processor according to one or more embodiments.

Figure 3:
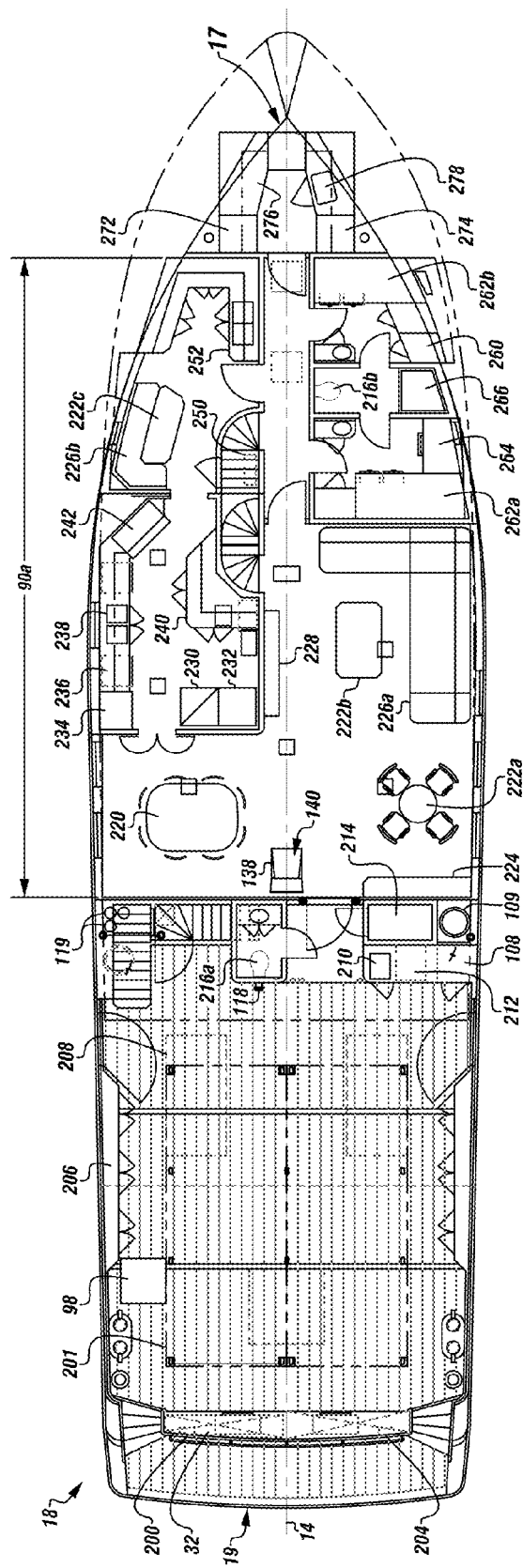
FIG. 3 depicts a main deck arrangement of the floating vessel according to one or more embodiments.

The present embodiments are detailed below with reference to the listed Figures.

DETAILED DESCRIPTION OF THE EMBODIMENTS

Before explaining the present vessel in detail, it is to be understood that the vessel is not limited to the particular embodiments, and that it can be practiced or carried out in various ways.

One or more embodiments relate to an oceanographic research and development vessel that is uniquely designed with special plates and skegs in the hull that enable the vessel to sit upright on a sandbar or mudflat for emergency repairs without the vessel listing in either direction.

The vessel can be used to develop offshore renewable energy resources including power that can be harnessed from tidal action, wind, and waves.

The vessel can perform oceanographic research, such as by micro and macro sighting for areas appropriate for renewable energy developing. For example, the vessel can be used to sight an area appropriate for tidal power by determining an area with a water depth that is suitable for tidal turbines and an area where the current is suitable for tidal turbines.

The vessel can perform renewable energy development, such as by carrying equipment, installation crews, dive crews, and other personnel and equipment usable to develop offshore renewable energy resources.

The vessel can perform monitoring and maintenance of renewable energy sites, such as by providing living quarters and resources to crews to provide monitoring and servicing of equipment and machinery used in the development of offshore renewable energy resources.

The vessel can be configured for all-weather operation for oceanographic research, development, monitoring and maintenance of offshore renewable energy resources. For example, the vessel can be an ice class vessel, have open ocean stability due to the design of the vessel, and have interior living spaces for crew that are heated and air conditioned.

One or more embodiments of the vessel can be built to the standards of the American Bureau of Shipping Steel Vessels Under ninety meters in length with Ice class "CO" the vessel is capable of sustaining single compartment flooding and staying afloat.

The vessel can be made of steel, and can be welded. The vessel is a twin-screw, diesel propelled, single chine vessel.

The vessel can have a hull with dual parallel skegs. Each skeg can be attached to the hull and extend from the hull, providing a flat face in the direction of a sea bottom.

Propeller shafts of the vessel can be mounted through each skeg. The skegs can be mounted on either side of a centerline of the vessel below the waterline and between the bow and the stern. In one or more embodiments, the skegs can extend about 75 percent the length of the vessel and stop before the stern. Skeg plates can be mounted to the skegs. The skegs can be tapered in the bow portion of the skeg, enabling the vessel to move in water with a lower coefficient of friction.

A bow plate can be mounted between the skeg plates at the bow of the hull. The skegs with the skeg plates, and the bow with bow plate can provide three evenly balances flat surfaces that enable the vessel to ground without damaging its propellers, such as onto a sandbar. As such, crew can then make repairs on the vessel while the vessel is in a non-listing, non-leaning upright position. For example, in operation, after a high tide comes in on the sandbar, the vessel can float from the sandbar. As such, the vessel can be grounded and refloated in a stable manner, preventing any deck mounted standard containers from sliding off of the deck, and preventing instruments and other equipment and items from falling or sliding. Therefore, the vessel can be repairable without having to return the vessel to port.

A bulbous bow extension can be connected to the bow of the hull. The bulbous bow extension can be hollow steel and cylindrical in shape, and can enable the vessel to reach speeds of up to 12 knots, while also saving fuel when compared to similar vessels without the bulbous bow extension. The bulbous bow extension can be welded to the bow below the waterline to achieve maximum fuel savings. For example, the bulbous bow extension can be save from about 2 percent to about 5 percent in fuel costs. The bulb bulbous extension can extend from the hull by about 8 feet, and can be about 3 feet wide. Hollow embodiments of the bulbous bow can reduce weight at the bow of the vessel, keeping the vessel more evenly balanced.

The vessel can include a main deck, which can include reinforced stringers beneath the main deck and at least a ⅜ inch steel plate. A main deck bulwark can be installed all around the vessel and can be fabricated of ¼ inch plate with ¼ inch flanged brackets spaced 48 inches, for example. Bulwark caps can be a 100×6 bulb flat. A ¼ inch schedule 40 pipe grabrail can be fitted to the top of the bulwark cap.

The main deck can be configured to receive a cargo of five hundred forty pounds per square foot. Standard shipping containers, such as MASERK™ containers that are 20 feet long by 8 feet wide by 8 feet in height are supported on the main deck without deforming the deck.

The vessel can include a topsides formed in the main deck, which can include a fly bridge, a pilothouse, a dog house, a focsle deck, crew living quarters, anchor lighting, and navigation lighting. The vessel can also include crew living quarters disposed below the main deck. The topsides can include storage, living quarters for crew, and alarm systems, which can engage equipment below the hull deck and the deck.

The navigation lighting and anchor lighting connect to a DC set of 12 volt batteries, which can be charged by a solar panel during the day, or by a wind turbine that can be used day or night.

The pilot house can have a navigation station, and a steering device connected to a steering system that can engage two rudders, which can be operated independently or in tandem. The pilot house can also have a thruster steering device, which can connects to a hydraulic pump that can operate the hydraulic bow thruster. The pilot house can have a communication system that can provide ship-to-shore, ship-to-ship, and intra-vessel communications. The communication system of the vessel can include a sound powered phone system, Cat5 network cable outlets, television outlets, a security camera system, and door alarms.

The pilothouse can have two 4-dog doors with fixed windows. The doghouse can have one 2-dog door. The main deck can have one 6-dog Dutch door with a fixed window and tonnage opening, and other such doors for access to various portions of the vessel.

The doghouse, between the pilothouse and the main deck, can be used to store electronic equipment and support equipment for the pilothouse.

The vessel can have an aft deck escape hatch with quick acting hinges for escape by the crew during emergency ingress and egress, and for the transfer of supplies. The escape hatch can be a 24 inch by 24 inch square watertight hatch that can be latched or have a quick release mechanism.

The vessel can include manholes, escape hatches, and doors, that can all be watertight or weather tight, such as painted aluminum doors with steel frames made by Diamond SeaGlaze. The vessel can include watertight doors with windows, providing lower deck access at watertight bulkheads.

In one or more embodiments, the vessel can include a plurality of manholes disposed through the deck and at least three escape scuttles formed in the deck. The manholes can be used for inspection of fuel tanks and other such equipment. The escape scuttles can be used for ingress and egress, and for resupplying and maintenance of the vessel.

The vessel can have a plurality of live wells, each with an intake port and a discharge port, which can be used for marine life research.

The hull can have a plurality of interior bulkheads, each of which can have a layer of insulation to reduce noise and vibration transmission throughout the hull. The bulkheads of the vessel can be both longitudinal and transverse bulkheads. One or more bulkheads can bind oil tanks of the vessel, and watertight bulkheads, can be welded continuously on both sides. In one or more embodiments insulation on each bulkhead can be made of mineral wool.

In one or more embodiments, each hull compartment can be fitted with vertical access ladders or bulkhead rungs. Inclined ladders can be fabricated from channel stringers with 3/16" flanged plate threads, and can be a minimum of 28" clear width. Inclined ladders can be fitted with railings.

In one or more embodiments, all exterior decks of the vessel can be cambered a minimum of two percent of their full breadth.

A plurality of sonar tubes can be formed in the hull, each with a sonar transducer that enables the vessel to perform research and to avoid hitting underwater obstacles. The sonar transducers can connect to a sonar display in a pilothouse formed in topsides of the vessel mounted over the main deck.

The sonar tubes can terminate above the waterline of the vessel. The sonar transducers and sonar tubes can be used to determine water depths, current velocity, and sea bottom profiles for assessing an areas potential for renewable energy resources. An exemplary sonar transducer can include one made by Wesmar.

The vessel can include two anchor hawser pipes in the hull for deploying and retrieving mooring anchors. The anchor hawser pipes can have roller fairlead and anchor fluke bolsters mounted on a stem pulpit at the centerline.

The hull can have an engine room therein with main engines and main generators. An emergency generator can be disposed outside of the hull, such as in the doghouse, such that the emergency generator is located away from any fire that might occur in the engine room.

The main engines can be Caterpillar, Cummings, or Mitsubishi diesel propulsion engines. The main engines can also include vibration isolation mounts to minimize engine sound and vibration, such as a Low Res type mount.

The main generators can be Westerbeake generators and the emergency generator can be used when the main generators fail. The vessel can use two 60 kW diesel generators, as the two main generators, producing a total capacity of 120 kW.

The vessel can be designed to operate on just one of the generators, such as when the other of the generators is needed to supply power to a renewable energy facility or another vessel tied alongside the oceanographic research vessel. The main engines and generators can be operated with fuel fed through fuel piping from fuel tanks in the hull. The fuel tanks can have a volume ranging from about 7,500 gallons to about 15,000 gallons.

The vessel can include keel coolers that can be used to enable heat dissipation from each main engine. Each keel cooler can be fitted to the hull, such as with a plate guard. The keel coolers can be of sufficient size to enable heat dissipation per engine manufacturer's recommendation from the main engines, gears, and the main generator. The keel coolers can be fitted to the external portion of the hull with heavy steel plate guards for protection. Illustrative keel coolers can include those made by R. W. Fernstrum & Company, Inc. of Michigan. The keel of the vessel has keel coolers and plate guards.

In one or more embodiments the vessel can include generators, pumps, compressors, motors, hydraulic units, and exhaust systems. The vessel can include separate exhaust systems for each of the main engines, the generators, and the hydraulic power unit.

The exhaust system can include exhaust lines covered with 2 inches of Johns-Mansville thermobestos insulation. Engine room exhausts can exit on port & starboard sides aft through side shell. Engine mufflers can be mounted to the overhead with vibration isolating mounts. The engine muffler can be Maxim MSA-2 or equivalents. An emergency generator and hydraulic power unit exhaust can run vertically to above a fly bridge cover.

The vessel can include a compressed air system, such as two Quincy or D325 air compressors with 5 HP motors, two 120 gallon air receivers, and a regulator switch, which can be installed to operate the air starting of the main engines, the generators and an air horn. Various air connections can be installed on various portions of the vessel.

The vessel can include isolation mounts on each generator, pump, compressor, motor, engine, hydraulic unit, and exhaust system on the oceanographic research vessel.

The engine room can include a plate floor, which can be a $3/16$ of an inch check aluminum floor plate configured in panel sizes that can be conveniently handled by a single person. The plates can be secured by stainless steel screws. The engine room can have engine room supply fans with one horse power motors to deliver five thousand cubic feet per minute of air each.

The vessel can have piping fuel, bilge water, and ballast. The engine room and other portions of the hull can be kept free of water build using bilge pumps and the bilge piping for disposing water in the hull appropriately off the vessel. The piping can be made of stainless steel and can have diameters ranging from about 1 inch to about 4 inches.

The vessel can also include valves for the piping in the hull. Piping potentially subject to mechanical damage or undue vibration can be protected and/or supported. The piping can include butterfly valves.

Overflows can be installed for all compartments or tanks to which liquid is supplied under pressure, such as fresh water tanks, fuel oil tanks, and holding tanks The overflow can be combined with air escapes and can overflow to the deck. All vents can be schedule 40 stainless steel pipe with inverted ball checks of bronze.

The engine room can have an alarm system that can include a bilge alarm. The bilge alarm can have a siren installed forward in the engine room with a second alarm located in the aft end of the main deckhouse.

The vessel can also include a general alarm system fitted onboard the vessel with contactors, bells, and strobe lights. Four DUALITE™ emergency self-activating lights, double lights, and a single battery can be mounted and installed on the exterior part of the vessel to be illuminated. Two hand held emergency battle lanterns can be provided at the entrance to machinery spaces.

The propeller shafts connecting to the propellers can be stainless steel, such as Aquamet 17 shafts with Johnson Rubber cutlass bearings, installed in the stern tubes. The stern tubes can be supported from the hull and shell by the skegs. Shaft couplings can be used to attach each propeller shaft to a propeller.

The stern tubes can be hollow tube-like structures at the stern or rear part of the vessel through which the propeller shafts can pass and connect to the main engines. The stern tubes can protect the propeller shafts from engagement with foreign objects in the water. The stern tubes can be fabricated from mechanical steel tubing and extra heavy steel pipe, machined on aft end to receive a cutlass bearing press fit, and bolted to tubing. A water scoop can be fitted to each skeg to supply stern tubes of the vessel with seawater. At the forward end, the stern tubes can include a drip-less stuffing box, such as one made by Symplan. The seawater supplied by the water scoops can provide lubrication to the cutlass bearing.

In operation, the starboard propeller and the port propeller can turn inward to the centerline and/or outwards from the centerline of the vessel for navigation, propulsion, and dynamic positioning of the vessel. The propellers can be five bladed stainless Federal style propellers, with diameters of fifty four inches and a pitch configured to suit the engine.

The rudders can be a starboard double plate rudder for steering the vessel, and a port double plate rudder for steering the vessel. The starboard rudder can be used with the starboard propeller. The port rudder can be used with the port propeller. Each double plate rudder can be connected with a rudder tube to the hull.

In one or more embodiments, each rudder of the vessel can be a balanced rudder that can include a shoe piece supporting structure and a stop to provide structural support and protection to the rudder.

In one or more embodiments, each rudder shaft of the vessel can have a diameter of no less than three inches, and can be formed from stainless steel rudderstock.

In one or more embodiments each propeller of the vessel can be a five bladed ice class propeller with a diameter of at least fifty inches. Each propeller can be pitched to match each engine.

The rudder shafts can be four inch diameter stainless Aquamet 17 rudderstock, with bearings journals fitted top and bottom with bronze bushings pressed into the rudder tube. The rudders each have a stuffing box that is fitted to the rudder shafts above the waterline. The uppermost rudder can be fitted with a stop to provide structural support and protection to the rudder and a shoe piece supporting structure, which is known in the marine industry.

The vessel can include a hydraulic bow thruster, which can be a transversal propulsion device built into or mounted to the bow of the vessel, and can allow the vessel to be more maneuverable. The hydraulic bow thruster can make the vessel easier to dock by allowing a captain to turn the vessel to port or starboard without using the propulsion machinery, which can require forward motion for turning. The hydraulic bow thruster can have a 24 inch diameter, a 36 inch length, and 90 horse power.

A hydraulic pump engine can power the hydraulic bow thruster, which can be capable of pumping sixty two gallons per minute and 2500 psi with open loop fixed displacement. The hydraulic bow thruster can have an electrical backup, which can be a 20 horse power unit.

All piping in the hydraulic system of the hydraulic bow thruster can include stainless tubing and fittings, and can be controlled from the wheelhouse. In operation, the hydraulic bow thruster can be used in the dynamic positioning of the vessel.

The vessel can include a steering system, including the steering devices, such as steering wheels, two non-follow-up levers in the pilothouse, hydraulic steering pumps, and other related equipment well known to those skilled in the art.

The vessel can include a propulsion system that can connect the main engines to propeller shafts that pass through stern tubes to propellers mounted beneath the hull and behind first and second skegs.

The vessel can have dynamic positioning capabilities for oceanographic research, development, monitoring, and maintenance of offshore renewable energy resources. For example, the vessel can have independently operable propellers usable for dynamic positioning, a variable speed transmission, and rudders that can operate in tandem or independently. For example, a starboard propeller can be rotated clockwise while a port propeller rotates counterclockwise.

The hydraulic bow thruster and the propulsion system can be connected to a dynamic positioning processor that can communicate with the navigation system and a network, such as a satellite network, enabling the dynamic positioning processor to automatically position the vessel at a certain latitude and longitude. For example, the vessel can include dynamic positioning equipment available from Kongsberg of Norway, or the another commercially available dynamic positioning system. Additionally the vessel can have at least three gyro stabilizers mounted in the hull to keep the crew from becoming seasick from pitch, yaw, and heave, and providing a safer work environment.

The vessel can include a knuckle boom crane on the topsides for launching a rescue/tender vessel, as well as loading and unloading deck cargo and renewable energy maintenance parts and equipment. Usable knuckle boom cranes can be ones like those made by ALASKA MARINE™ or HAIB™. Typically these are folding cranes that can have three or four sections and can fold flat while the vessel is underway or in a heavy sea.

The rescue/tender vessel on the topsides can be used for escaping the vessel in emergencies and for transferring crew, parts, and equipment from the vessel to other locations, such as to renewable energy equipment and machinery. The vessel can include a scuba tank compressor on the topsides for use in scuba operations, such as in maintenance and inspection of underwater renewable energy equipment and machinery.

The vessel can include a fuel oil centrifuge in the engine room for cleaning fuel. For example, the vessel can include one or more fuel storage tanks for holding back-up fuel, and the vessel can include one or more day fuel tanks for storing clean engine fuel for operating the vessel.

The fuel oil centrifuge can be in fluid communication with the one or more fuel storage tanks for receiving fuel therefrom. The fuel oil centrifuge can be used to clean the received fuel. The fuel oil centrifuge can be in fluid communication with the one or more day fuel tanks for transferring the cleaned fuel thereto. Alpha Lavel™ provides usable fuel oil centrifuges that can be used on this vessel for longer offshore stays.

In one or more embodiments a length of the oceanographic research vessel can be from seventy five feet to one hundred forty feet, such as a length of one hundred two feet and seven inches. An illustrative embodiment of the vessel can be ninety feet long, twenty six feet wide, and have a depth of twelve feet for the hull. A beam of the vessel can be from twenty feet to thirty feet. The draft of the vessel can be from seven feet to ten feet. A gross tonnage of the vessel can be less than three hundred tons. A length of the waterline of the vessel can be from about 60 feet to about 120 feet. A depth of the vessel can be from about 10 feet to about 14 feet. The displacement of the vessel can be two hundred sixty five long tons. A fresh water capacity of the vessel can be from about 1,000 gallons to about 4,000 gallons. A holding capacity of the vessel can be from about 1,000 gallons to about 4,000 gallons. The vessel can have an air draft from about 20 feet to about 50 feet, which means the vessel can get beneath short bridges, which is a significant advantage in waters of Puget Sound and Long Island Sound which has short bridges. In one or more embodiments, the vessel can accommodate up to 20 crew members. The vessel can have other dimensions and capacities depending upon the particular application.

In one or more embodiments the vessel can include a fill and discharge system for filling and discharging the fuel tanks and the oil tanks. The fill and discharge system can include one or more pumps and hoses for transferring fuel and oil.

An electric positive displacement gear pump can be skid mounted with a twenty gallon per minute capacity. The electric positive displacement gear pump can take suction from a fuel oil manifold with butterfly valves for transfer to tanks using a main deck discharge pipe. As such, the vessel can be used to transfer fuel to other vessels in need of fuel.

The vessel can include one or more lube oil storage tanks and a five hundred gallon capacity dirty oil tank. The lube oil storage tanks can be fitted with a drain and connection to a transfer pump. A dirty oil pump can be piped from each engine and marine gear to the dirty oil tank.

In one or more embodiments the vessel can include a potable water system for providing potable water to crew members of the vessel. The potable water system can include a water maker, and potable water tanks with three inch pipes. A vent with a screen can be fitted to the tanks. Two pressure sets with relief valves and diaphragm tanks can take suction from a potable water tank manifold to plumbing features and to two hot water boilers fitted for ship services. The potable water can be filtered multiple times and ultraviolet treated. A hot water circulation circuit can be fitted in a loop to serve all fixtures on the vessel. The water maker can be a 1200 gallon per day water maker, such as an AQUA WHISPER™.

In one or more embodiments the vessel can include a main fire system. The main fire system can include a fire pump for causing fire suppression to a fire main and a seachest for servicing at least four fire stations. For example the fire pump can be a fire pump Model #10CCE Barnes 2×2 5 horse power fire pump.

The seachest can be a cast steel gate valved seachest located in the engine room, and can be large enough to accommodate the flow of any three pumps simultaneously.

The vessel can include a fire suppression system fitted to flood the main engine room space with carbon dioxide. Bottles of carbon dioxide can be housed in a steel compartment on the aft main deck. Dampers can be fitted in an engine room ventilation air intake and exhaust openings that can be actuated by the fire suppression system automatically via carbon dioxide pressure.

The vessel can include various fire fighting and safety equipment including dry chemical fire extinguishers, fire axes with brackets, life rings, signaling devices, inflatable life rafts in canisters with hydrostatic release, life jackets, and first aid kits.

In one or more embodiments the vessel can include a bilge system including a bilge pump that operates as a fire pump. The bilge pump can be configured and arranged to discharge overboard with a check valve and gate valve at the shell. An illustrative bilge pump can include a bilge pump Model #5CCE Barnes 1 1/2×1 1/2 three horse power pump with direct engine room suction piped into a bilge manifold. Piping of the bilge system can be schedule 80 steel pipe. The bilge system can include an electric submersible bilge pump with an automatic float switch in each hull compartment.

In one or more embodiments the vessel can include an anchor windlass mounted to the deck for lowering and raising an anchor, such as a Danforth type anchor with at least one hundred fathoms of chain and swivel connections. The chain can be ¾ inch grade two stud link chain. The anchor windlass can be a machine that restrains and manipulates the anchor chain and/or rope on the vessel, allowing the anchor to be raised and lowered. The anchor windlass can include a notched wheel engaged with links of the chain or the rope, and a brake for controlling the chain or rope. The anchor windlass can be powered by an electric or hydraulic motor operating via a gear train. The vessel can include two hydraulic anchor winches for remote operation from the pilothouse.

In one or more embodiments, the vessel can include gyro type stabilizer units disposed or mounted in the hull and connected to the navigation station. For example, the vessel can include three gyro type stabilizer units. The gyro type stabilizer units can be a Mitsubishi, Seakeeper, or the like. The gyro type stabilizer units can be used for stabilization of the vessel at zero speed or while under way.

In one or more embodiments, the vessel can include a chine in the hull and a plurality of roll chocks installed on the chine. Each roll chock can be welded to the hull and can extend for at least twenty feet per side of the hull. A flat bar can be welded continuously to the shell plate at a junction of the roll chock.

In one or more embodiments, the vessel can include from twenty five to thirty five anodes installed on an underwater area of the hull to offset electrolytic action to protect against corrosion. The anodes can be M-24 anodes, and can be installed at underwater locations on the vessel to offset electrolytic action. The anodes can be zinc.

The vessel can include sanitary features, such as a complete Royal Flush Headhunter system. The vessel can include "Superbowl" toilets, sump pumps, and a sewage treatment plant. Drains of the sanitary features can be routed to sumps below deck with pumps connected to a manifold to route them to holding tanks, the treatment plant, or to a discharge station in the transom concealed behind a panel.

All gray drains from sinks, showers, and washers can be led to a 30 gallon sump tank below deck. An electric sump pump of a suitable size can be fitted to the sump tank for discharge overboard, to holding tanks, or to a deck fitting. Exterior deck drains can be fitted with large flush intake screens.

The vessel can include refrigeration and air conditioning components, including coolers and freezers of marine grade.

A multi-compressor chilled water system, such as an AquaAir or equivalent, can be installed with an arctic package for supplying heat and racked as a modular unit.

Three main fan coil units can be fitted in the doghouse to cool and heat the pilothouse, galley, and salon/mess areas.

Two fuel fired boilers can be installed. The exhaust ducts can be of steel construction and insulated with 1 inch thick Johns-Mansville thermobestos insulation with aluminum sheathing.

All toilet spaces can be fitted with air conditioning outlet registers, heat, light, night light and exhaust fan modules.

A separate outside air forced ventilation system can be provided for all interior accommodation spaces to provide fresh air supply.

The vessel can include a main switchboard. The main switchboard can be used for parallel operation of the service generators on the vessel. The service generators can each be 60 kilowatts.

The main switchboard can be a free standing, fully enclosed, dead front type arranged in suitable panels substantially constructed with steel frame work.

The main switchboard instruments can be capable of withstanding anticipated conditions of vibration, roll, list, trim, and the like. The main switchboard can be arranged for control of the two 120 volt single or three phase diesel driven generators, and for distribution of AC power. The main switchboard can have a 100 amp shore power breaker complete with a "Glendenning" electric rollup shore power connection box and cable drum with remote control.

The vessel can have exterior and interior lighting. For example, two Carlisle—Finch 14" 1000 watt pilothouse controlled searchlights can be mounted at a top of the pilothouse. The pilothouse can also include navigational lighting. Deck lights and floodlights can be controlled from the pilothouse and can be brass Pauluhn or the like. Interior lights of the vessel can be fitted with dimmers.

Suitable masts can have the following installed: navigation lights with provisions for day shapes, such as LED type lights, a white anchor light, a white range light, a white stern light, red and green side lights, and red and white restricted ability to maneuver lights.

One or more embodiments of the vessel can include a battery for starting each generator. Each battery can be a 12 volt HT-8D battery. Each battery can be installed in a fiberglass container located in the engine room and can be charged by a small independent trickle charger. Four 12 volt HT-8D storage batteries can be provided for navigation lights and an electronics panel in pilothouse. A fixed solar panel array can be provided on the fly bridge top to supplement charging the pilothouse batteries.

The vessel can have various appliances, pieces of furniture, finished carpentry, windows, and interior deck covering, such as carpet and tile, and the like to accommodate crew members living on board.

The vessel can have insulation in the living quarters. The overhead and exterior bulkheads of all quarters and the pilothouse can be insulated with 2 inch thick mineral wool. The below deck floor can be sheathed with 1 inch thick rigid mineral wool board. The interior bulkheads can be sound insulated with 1 inch thick mineral wool. The aft bulkhead of the below deck quarters can have a thin lead liner added for additional sound insulation. The engine room and lazarette overhead and sides can be insulated with 2 inch mineral wool and covered with perforated aluminum sheathing. The laundry compartment can be insulated and sheathed similar to the engine room. One or more live wells can be insulated.

Turning now to the Figures, FIG. 1A depicts a starboard side of an embodiment of the floating vessel 10 usable for oceanographic research, development of renewable energy resources, and maintenance of the renewable energy resources. FIG. 1B depicts a detail of a portion of the propulsion system of the floating vessel 10.

The floating vessel 10 can include a hull 12, which can have a length of one hundred feet. The hull 12 can have a keel 11, a bow 17, and a stern 19.

One or more embodiments of the floating vessel 10 can be repaired while at sea. For example, the hull 12 can be adapted to sit level without leaning on a mudflat during a low tide, enabling a crew of the floating vessel 10 to initiate repairs to the floating vessel 10 without having to return the floating vessel 10 to port.

A bulbous bow extension 145 can extend from the bow 17 parallel to the hull 12 and to skegs on the hull 12. The bulbous bow extension 145 can be disposed below a waterline 16 of the hull 12. The bulbous bow extension 145 can artificially extend the waterline 16 of the hull 12, such as by at least five percent, providing for increased speed of the floating vessel 10. A hydraulic bow thruster 66 can be disposed on the bulbous bow extension 145. The hydraulic bow thruster 66 can thrust to move the bow 17 of the floating vessel 10 side-to-side.

The hull 12 can have a bow plate 25 and a keel plate 23. The keel plate 23 can extend from the keel 11 between skegs on the hull 12, and can be located between the bulbous bow extension 145 and the hull 12. In one or more embodiments, the keel plate 23 can extend for about seventy five percent the length of the hull 12. The keel plate 23 can be about 3 inches thick, about 12 inches wide, and about 60 feet long, and made of steel.

The floating vessel 10 can have a main deck 18 formed on the hull 12. The main deck 18 can have a space and a strength adequate to support at least two standard shipping containers without collapsing.

The floating vessel 10 can a focsle deck 26. A knuckle boom crane 100 and a rescue/tender vessel 102 can be on a rear portion of the focsle deck 26.

An anchor windlass 128 can be on the focsle deck 26. The anchor windlass 128 can be used to raise and lower a Danforth type anchor 43 on a chain 41 threw an anchor hawser pipe 42 in the hull 12.

A doghouse 86 and one or more living quarters 90 can be disposed below the focsle deck 26.

The floating vessel 10 can have a flood light 96, a spot light 97, a pilot house 78, anchor lighting 101, navigation lighting 103, and a flybridge 79 disposed above the focsle deck 26.

The propulsion system can include, in-part, a starboard propeller shaft 57 with a first shaft coupling 52a. A first stern tube 54a can surround the starboard propeller shaft 57.

A starboard propeller 56 can be connected to the starboard propeller shaft 57, and can turn clockwise and/or counterclockwise.

The floating vessel 10 can have a starboard streamlined double plate rudder 58 connected to a starboard rudder tube 65. Each streamlined double plate rudder can be configured to be operated independently or operated in tandem.

A shoe piece supporting structure 134 and a stop 136 can provide structural support and protection to each streamlined double plate rudder.

The floating vessel can include at least one roll chock 143 welded to the hull and extending for at least twenty feet per side of the hull.

FIGS. 2A-2B depict a port side of the floating vessel. The floating vessel can have a topside 20, which can be formed or connected to the main deck 18.

The floating vessel can have from twenty five to thirty five anodes 146 installed on an underwater area of the hull and other portions of the floating vessel to offset electrolytic action.

The floating vessel can have a plurality of watertight interior bulkheads 22a, 22b, 22c, 22d, and 22e.

The propulsion system can include a port propeller shaft 61 connected to a port propeller 59, which can turn clockwise and/or counterclockwise. The port propeller 59 can also include a shaft coupling 52b and a second stern tube 54b. Each propeller of the floating vessel can be independently operable.

The floating vessel can include a port streamlined double plate rudder 63 connected to a port rudder tube 60.

The floating vessel can include a plurality of watertight interior bulkheads 22a-22e.

FIG. 3 depicts a top view showing the arrangement of the main deck 18 of the floating vessel according to one or more embodiments.

The main deck 18 can hold one or more standard shipping containers 201 for transport.

Near the stern 19, the main deck 18 can have a sewage pump out 200 for removing sewage from the floating vessel, a fresh water shower 204, an aft deck escape hatch 98, and deck lockers 206.

Also, one or more live wells 32 can be on the main deck 18, each of which can have an inlet and an outlet for receiving and expelling water.

The main deck 18 can have various hatches providing access to portions of the floating vessel below. For example, the main deck 18 can have an engine hatch 208 providing access to the main engines below the main deck 18.

The main deck 18 can have various features, such as a fire main 118, a fill and discharge system 108, an outdoor sink 210, an ice maker 212, a wet locker 214, a first restroom 216a, an air intake for the engine room 109, and a stock of carbon dioxide containers 119.

Also, the centerline 14 of the floating vessel is shown.

The main deck 18 can have a first living quarters 90a, which can extend from approximately a middle of the floating vessel to the bow 17 of the floating vessel.

The first living quarters 90a can include various amenities, allowing a crew to live on the floating vessel. For example, the first living quarters 90a can include a salon area with a mess 220, a first table 222a, a second table 222b, shelving 224, first seating 226a, a television 228, and other such features.

The salon area can also have one or more manholes 138 providing access to one or more escape scuttles 140. Crew members and/or equipment can pass through the one or more escape scuttles 140.

The first living quarters 90a can include a galley area, which can have various appliances, such as a refrigerator 230, a freezer 232, an oven 234, a dishwasher 236, one or more sinks 238, a counter 240, a stovetop range 242, and other such items.

The first living quarters 90a can have a crew area with second seating 226b, a third table 222c, a dehumidifier 250, a lab 252, and other such features.

The first living quarters 90a can include a sleeping area having one or more restrooms, including a second restroom 216b, one or more lockers or bulwark lockers 260, one or more bunks 262a and 262b, one or more desks 264, and one or more showers 266.

The first living quarters 90a can have a hallway that can provide access to the various areas of first living quarters 90a. A laundry area can be located proximate the bow 17 at an end of the hallway, and can include a washing machine 272, a dryer 274, a fold table 276, a mop sink 278, and other such features.

Figure 4A:
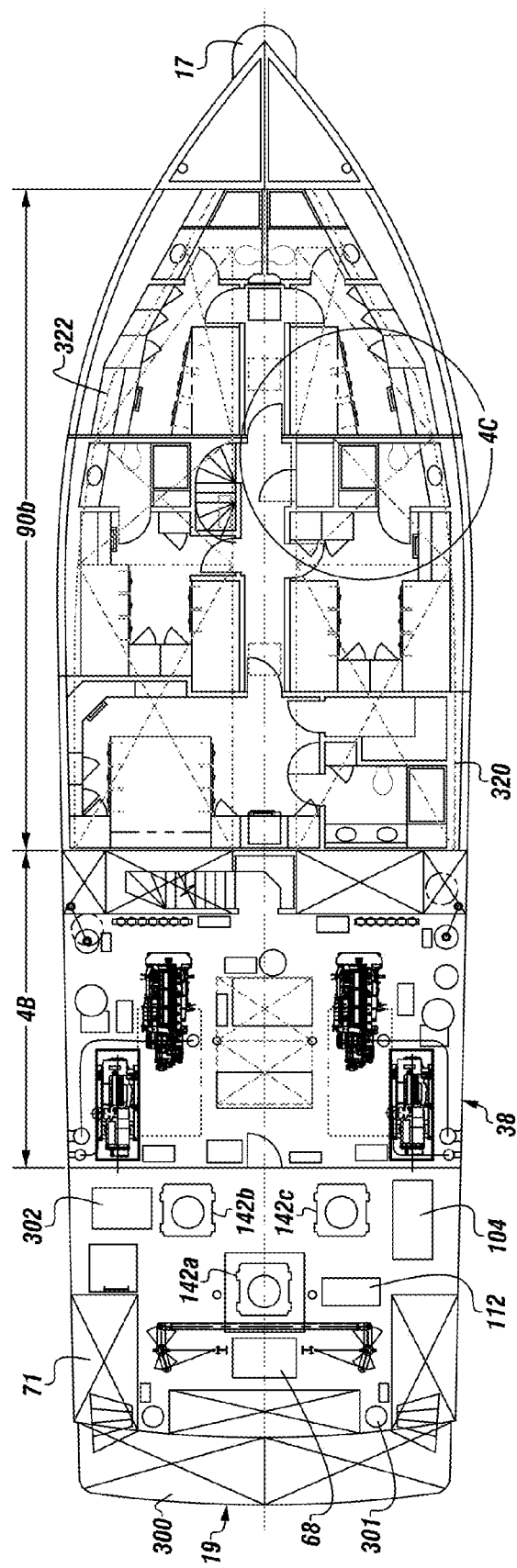
FIGS. 4A-4C depict a below deck arrangement of the floating vessel according to one or more embodiments.
Figure 4B:
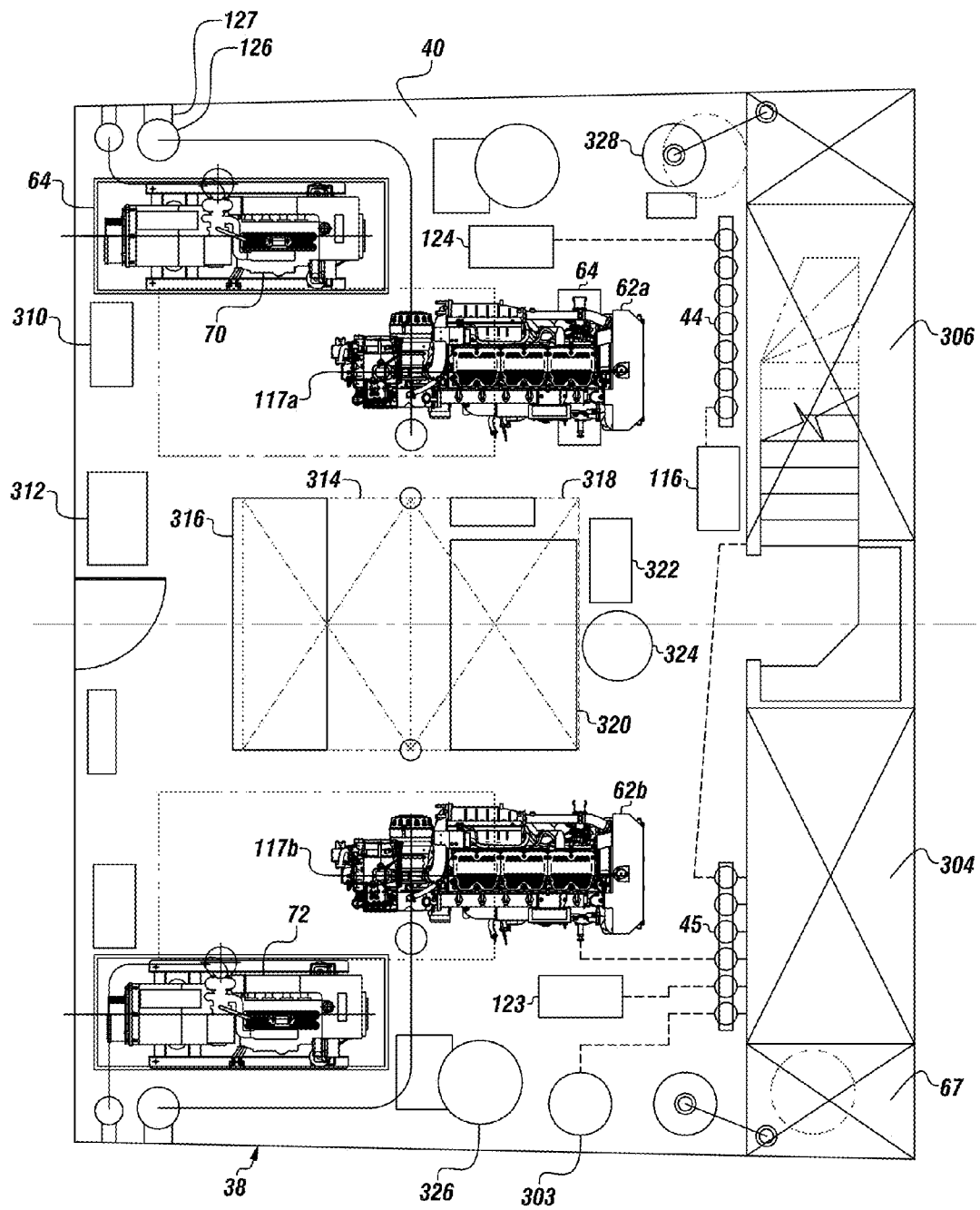
Figure 4C:
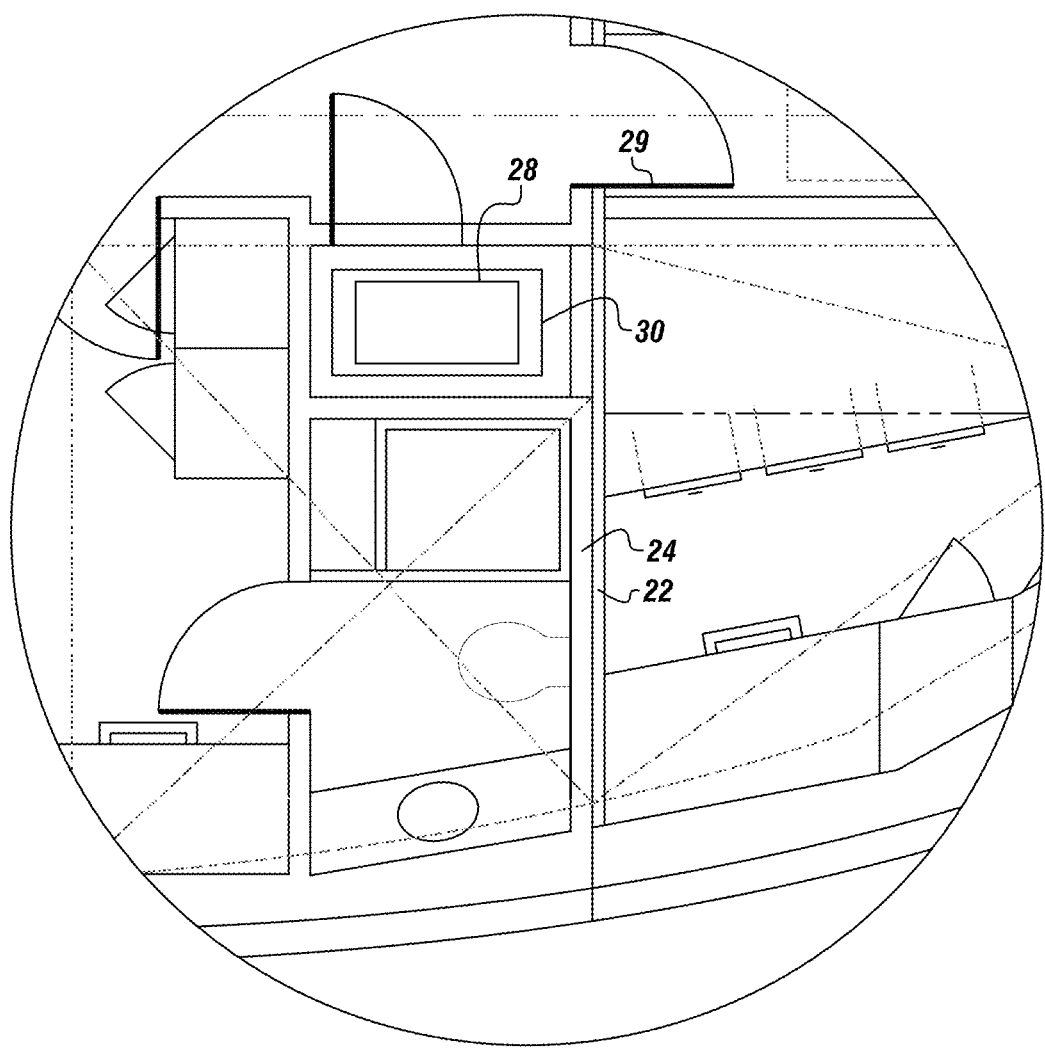

FIGS. 4A-4C depict detail views of a below deck arrangement of the floating vessel according to one or more embodiments.

Proximate the stern 19, the floating vessel can include one or more fresh water tanks 300 and one or more fuel wing tanks 71 mounted in the hull. The one or more fresh water tanks 300 can be in fluid communication with one or more fresh water pumps 301 for pumping fresh water. The one or more fuel wing tanks 71 can be in fluid communication with the main engines 62a and 62b through one or more fuel pumps 123.

The floating vessel can include a rudder steering system 68, which can be operatively engaged the streamlined double plate rudders for moving the streamlined double plate rudders. The rudder steering system 68 can be a hydraulic steering unit.

The floating vessel can include one or more gyro type stabilizer units 142a, 142b, and 142c mounted in the hull. Each gyro type stabilizer unit 142a-142c can include a roll chock welded to the hull and extending for at least twenty feet per side of the hull.

Portions of a potable water system of the floating vessel can also be located proximate the stern 19. For example, the potable water system can include a water maker 112, and the floating vessel can include a sewage plant 302 for processing sewage.

The floating vessel can include a scuba tank compressor 104.

The floating vessel can include an engine room 38, depicted in detail in FIG. 4B. The engine room 38 can have an engine room floor 40.

The main engines 62a and 62b can be mounted within the engine room 38 with one or more vibration isolation mounts 64 to minimize engine sound and vibration.

A fuel oil centrifuge 303 in the engine room 38 can operate to clean fuel for the floating vessel. For example, the engine room 38 can include one or more fuel set tanks 306 for holding back-up fuel, and one or more fuel day tanks 304 for storing clean engine fuel for operating the floating vessel. The fuel oil centrifuge 303 can be in fluid communication with the one or more fuel set tanks 306 for receiving fuel therefrom, such as through fuel piping 45, which can be a fuel manifold. The fuel oil centrifuge 303 can be used to clean the received fuel. The fuel oil centrifuge 303 can also be in fluid communication with the one or more fuel day tanks 304 for transferring the cleaned fuel thereto.

The main engines 62a and 62b can be in fluid communication with the one or more fuel day tanks 304, such as through the fuel piping 45. Each main engine 62a and 62b can be attached to a transmission 117a and 117b.

The engine room 38 can also include one or more batteries 310, and one or more main generators 70 and 72. The main generators 70 and 72 can be connected in parallel or in series, enabling one or both of the generators 70 and 72 to produce power for lighting, heat, air conditioning, and other electrical power throughout the floating vessel, and allowing the main generators 70 and 72 to produce power that can be used to power a facility or another vessel connected to the floating vessel.

The engine room 38 can include bilge piping 44 for bilge water. The bilge piping 44, which can be a bilge manifold, can be in fluid communication with one or more bilge pumps 124 for pumping the bilge water. The one or more bilge pumps 124 can be configured to operate as a fire pump. The engine room 38 can also include a separate fire pump 116, which can be part of a main fire system of the floating vessel. The main fire system can also include the fire main 118 (shown in FIG. 3), which can be in fluid communication with the fire pump 116. The fire pump 116 can be in fluid communication with the bilge piping 44 through the bilge pumps 124.

The engine room 38 can include one or more oil tanks 67. The fill and discharge system 108 (shown in FIG. 3) can be in fluid communication with at least one of: the fuel wing tanks 71, the fuel day tanks 304, the fuel set tanks 306, and the oil tanks 67 for receiving fuel and oil and for discharging fuel and oil from the floating vessel.

The engine room 38 can also include an oil water separator 312 for separating water from oil, a dirty oil tank 314 for holding dirty oil, an electrical switchboard 316, an oily bilge tank 318, an A/C chiller 320, an A/C pump 322, a shore power cable 324, one or more air compressors 326, one or more boilers 328, an exhaust system 127 for exhausting engine emissions, and other such engine related equipment and devices. The exhaust system 127 can have one or more isolation mounts 126.

The below deck arrangement can have a second living quarters 90b proximate the bow 17 of the floating vessel, portions of which are detailed in FIG. 4C. The second living quarters 90b can be similar to the first living quarters; having bunks, seating, lockers, restrooms, showers, furniture, and the like, but can be arranged in a different configuration.

One or more below deck fuel tanks 320 and one or more below deck holding tanks 322 can be disposed beneath the second living quarters 90b.

The below deck arrangement can have a plurality of sonar tubes 30 formed in the hull or otherwise disposed above the waterline. A sonar transducer 28 can be mounted in each sonar tube 30 and connected to a sonar display on the floating vessel.

Each of the plurality of watertight interior bulkheads 22 can be separately sealed with insulation 24 on at least one side. The plurality of watertight interior bulkheads 22 with the insulation 24, in combination with water tight doors 29 can ensure that, in the event that the integrity of one of the watertight interior bulkheads 22 is compromised, the remaining watertight interior bulkheads 22 can function to keep the floating vessel afloat.

Figure 5:
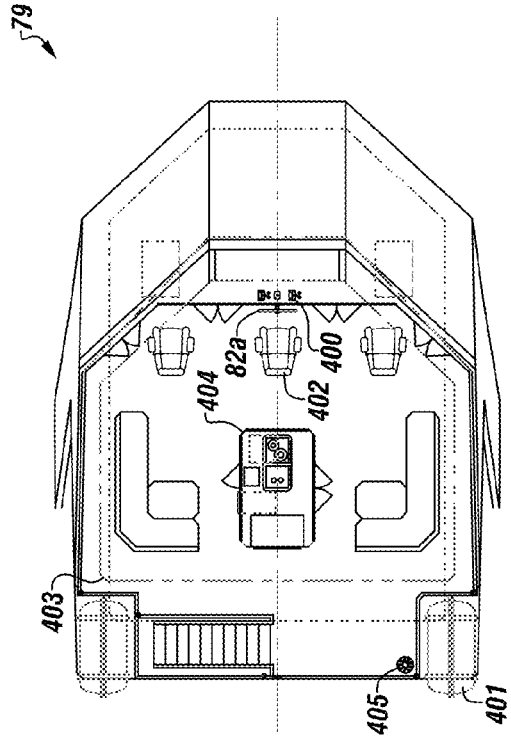
FIG. 5 depicts a flybridge of the floating vessel according to one or more embodiments.

FIG. 5 depicts an embodiment of the flybridge 79 according to one or more embodiments. The flybridge 79 can include one or more life rafts 401, one or more deck drains 405, and a hard top roof 403.

The flybridge 79 can include a control console 400 for controlling portions of the floating vessel. The control console 400 can include a first steering device 82a, which can be operatively engaged with the streamlined double plate rudders for steering the floating vessel. The control console 400 can include control console seating 402.

The flybridge 79 can also include flybridge kitchen equipment 404, which can include a grill, a sink, an icemaker, and the like.

Figure 6:
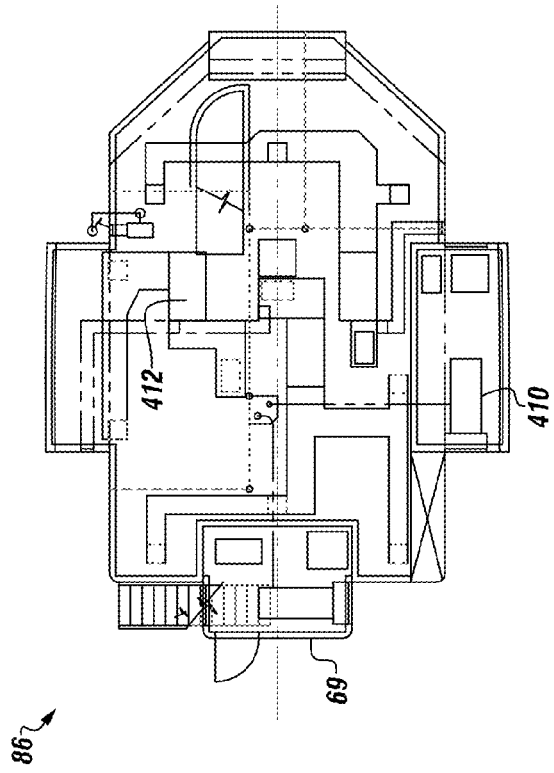
FIG. 6 depicts a doghouse of the floating vessel according to one or more embodiments.

FIG. 6 depicts an embodiment of the doghouse 86. The doghouse 86 can include various portions of electrical equipment and the like for the floating vessel. For example, the doghouse 86 can having an emergency generator 410, one or more A/C units 412, a hydraulic pump 69 for operating the hydraulic bow thruster, and the like.

Figure 7:
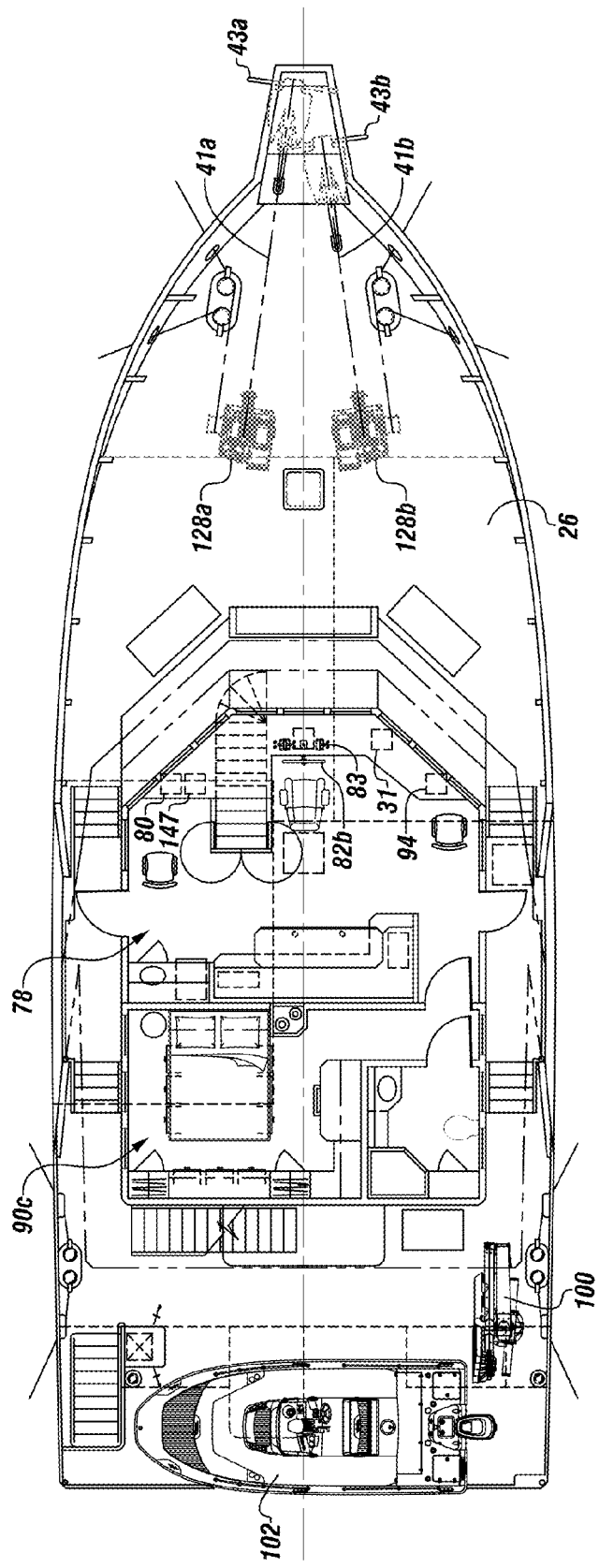
FIG. 7 depicts a pilothouse and a focsle deck of the floating vessel according to one or more embodiments.

FIG. 7 depicts an embodiment of a pilothouse 78 and focsle deck 26 of the floating vessel.

The focsle deck 26 can a first anchor windlass 128a and a second anchor windlass 128b mounted thereto for lowering and raising a first Danforth type anchor 43a and a second Danforth type anchor 43b with a first chain 41a and a second chain 41b.

The knuckle boom crane 100 and the rescue/tender vessel 102 can both be disposed on the focsle deck 26.

The pilothouse 78 can also include a third living quarters 90c with various amenities and features similar to the first and second living quarters.

The pilothouse 78 can include a navigation station 80, which can include charts and the like for navigating the floating vessel.

The pilothouse 78 can include a second steering device 82b for steering the streamlined double plate rudders, and a thruster steering device 83 for steering the hydraulic bow thruster.

The pilothouse 78 can include communication systems 94 for providing ship-to-shore communication and ship-to-ship communication. Also, a sonar display 31 can be in communication with the plurality of sonar tubes for displaying data and graphics associated with data collected by the plurality of sonar tubes.

The pilot house 78 can include a dynamic positioning processor 147, which can be configured to continuously position the floating vessel at a latitude and a longitude.

FIG. 8 depicts a detail of the dynamic positioning processor 147 in communication with a GPS system 148 through a network 149.

The dynamic positioning processor 147 can be in communication with the navigation station 80, the first steering device 82a, the second steering device 82b, the thruster steering device 83, the rudder steering system 68, the communication systems 94, the port propeller 59, the starboard propeller 56, and the main engines 62a and 62b.

The dynamic positioning processor 147 can be configured to continuously position the floating vessel at a latitude and a longitude 155.

The dynamic positioning processor 147 can receive GPS signals 151 transmitted to the floating vessel from the GPS system 148 through the network 149.

The dynamic positioning processor 147 can be configured to control the streamlined double plate rudders using the rudder steering system 68 including the steering devices 82a and 82b.

The dynamic positioning processor 147 can be configured to control the port propeller 59 and the starboard propeller 56 using the main engines 62a and 62b through the transmissions 117a and 117b.

The dynamic positioning processor 147 can be configured to control the hydraulic bow thruster 66 using the thruster steering device 83, and to control the main engines 62a and 62b of the floating vessel to maintain a position of the floating vessel within a predetermined area 157.

For example, the dynamic positioning processor 147 can have computer instructions to control the streamlined double plate rudders, the propellers, the hydraulic bow thruster, and the main engines of the floating vessel to maintain a position of the floating vessel within a predetermined area 153.

With the floating vessel at the latitude and longitude 155, a user can provide instructions to the dynamic positioning processor 147 to maintain the floating vessel within the predetermined area 157 around that latitude and longitude 155. For example, the user might want to maintain the floating vessel within 100 yards of the latitude and longitude 155, such as a position below a wind turbine that is being serviced.

The dynamic positioning processor 147 can monitor the GPS signal 151 associated with the floating vessel and determine whether or not the actual position of the floating vessel is within the predetermined area 157 around the particular latitude and longitude 155. For example, dynamic positioning processor 147 can include computer instructions to monitor the GPS signal associated with the floating vessel and determine whether or not the actual position of the floating vessel is within the predetermined area around the particular latitude and longitude 159.

If the floating vessel leaves the predetermined area 157, or before the floating vessel leaves the predetermined area 157, the dynamic positioning processor 147 can send control signals 161 to the streamlined double plate rudders, the propellers, the hydraulic bow thruster, and the main engines to control the position of the floating vessel to prevent it from leaving the predetermined area.

Also, the dynamic positioning processor 147 can provide the user with an indication 163 that the floating vessel has left or will leave the predetermined area such that the user can initiate the sending of control signals to the streamlined double plate rudders, the propellers, the hydraulic bow thruster, and the main engines in response to the indication 163.

The latitude and longitude 155 can be any position at which a user wants to maintain the floating vessel, such as a site where exploration or maintenance of energy resources is occurring. The predetermined area 157 can be any area appropriate for the particular area. For example, for a small area around a single wind turbine being maintained, the predetermined area 157 can be an area of 10 square feet. For a larger area, such as a rest period for crews and technicians without deploying an anchor and endangering underwater ecosystems, the predetermined area 157 can be larger, such as about 100 yards.

Figures 9A, 9B:
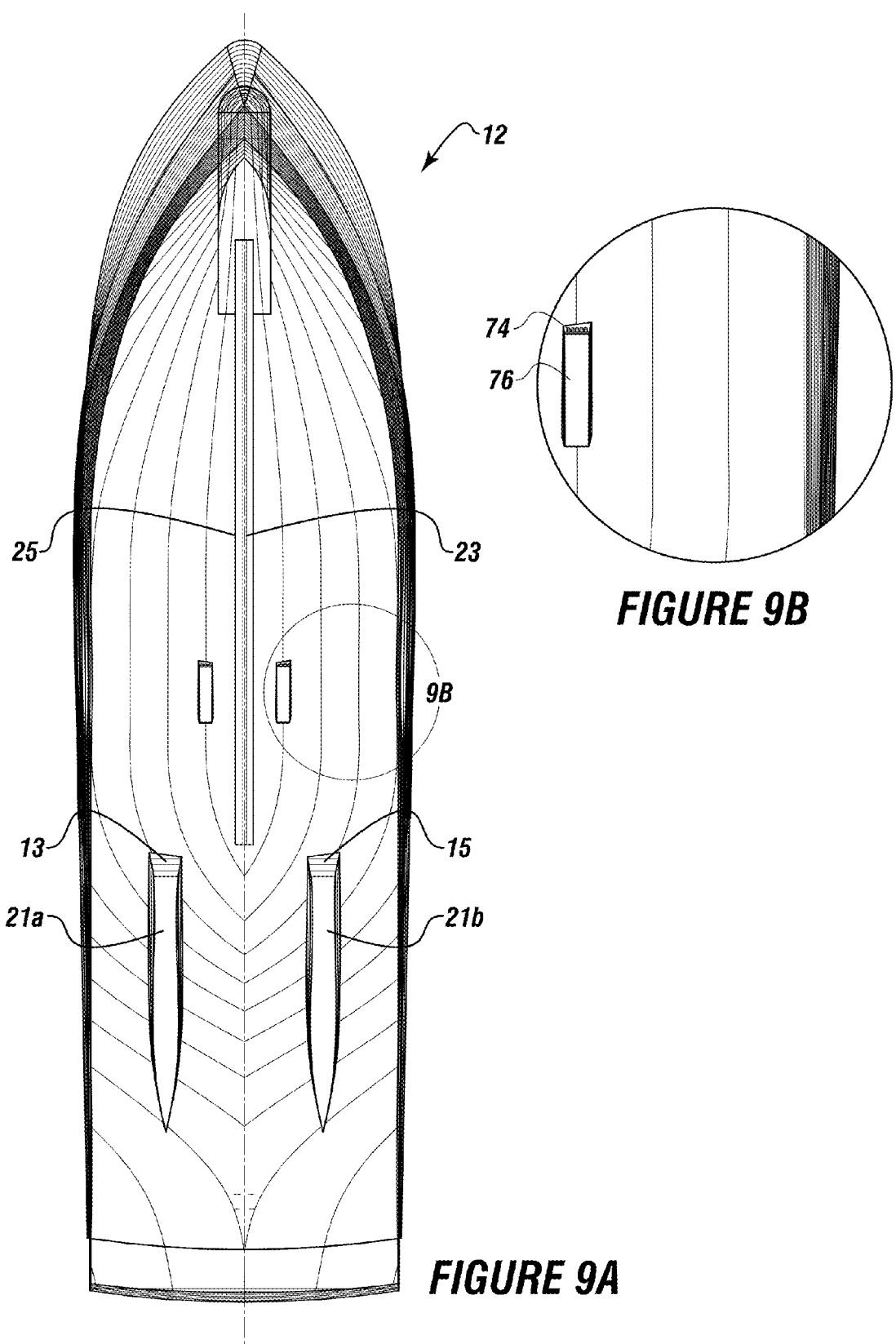
FIGS. 9A-9B depict a bottom view of the hull of the floating vessel showing the hull geometry according to one or more embodiments.

FIGS. 9A-9B depict a bottom view of the hull 12 according to one or more embodiments.

The first skeg 13 and the second skeg 15 can be on the bottom of the hull 12. Each skeg 13 and 15 can have a second skeg plate 21a and 21b attached thereto opposite the hull 12. The second skeg plates 21a and 21b can be about 12 inches in width, about 20 feet long, and about 3 inches thick, and can extend a length of the skegs 13 and 15.

Also, a keel cooler 74 for each main engine can be disposed on the bottom of the hull 12, enabling heat dissipation for each main engine. Each keel cooler 74 can be fitted to the hull 12 with a plate guard 76.

The keel plate 23 can extend along a centerline of a length of the bottom of the hull 12, and extend downwards and vertically therefrom. The bow plate 25 can be attached to the keel plate 23, and can extend perpendicular therefrom.

While these embodiments have been described with emphasis on the embodiments, it should be understood that within the scope of the appended claims, the embodiments might be practiced other than as specifically described herein.

What is claimed is:

1. A floating vessel for oceanographic research, development of renewable energy resources, and maintenance of the renewable energy resources, wherein the floating vessel is repairable while at sea, and wherein the floating vessel comprises:

a. a hull comprising: a keel, a centerline, a waterline, a bow, a stern, and a first skeg and a second skeg extending in parallel from the hull, wherein each skeg has a skeg plate attached thereto opposite the hull and extending a length of the skeg;

b. a bulbous bow extension extending parallel to the skegs from the bow and below the waterline, wherein the bulbous bow extension artificially extends the waterline of the hull for increased speed of the floating vessel;

c. a keel plate extending from the keel between the first skeg and the second skeg, wherein the keel plate is located between the bulbous bow extension and the hull, and extends no more than seventy five percent the length of the hull;

d. a bow plate mounted to the keel plate between each skeg plates, wherein the bow plate and the skeg plates provide flat surfaces that enable the floating vessel to ground and sit level on a surface, enabling a crew of the floating vessel to initiate repairs to the floating vessel without having to return the floating vessel to port;

e. a plurality of watertight interior bulkheads formed in the hull, wherein each watertight interior bulkhead is separately sealed, and wherein insulation is on one side of each watertight interior bulkhead;

f. a main deck formed on hull and topsides mounted over the main deck, wherein the main deck has a space and a strength adequate to support at least two standard shipping containers without collapsing;

g. a plurality of sonar tubes in the hull above the waterline;

h. a sonar transducer mounted in each sonar tube and connected to a sonar display on the floating vessel;

i. an engine room in the hull comprising an engine room floor;

j. anchor hawser pipes in the hull;
k. bilge piping for bilge water;
l. fuel piping for fuel;
m. a propulsion system in the hull comprising:
  (i) a starboard propeller shaft and a port propeller shaft;
  (ii) shaft couplings for each propeller shaft;
  (iii) stern tubes surrounding each propeller shaft and mounted axially through each skeg;
  (iv) a starboard propeller connected to the starboard propeller shaft;
  (v) a port propeller connected to the port propeller shaft, wherein the starboard propeller turns clockwise and the port propeller turns counterclockwise, and wherein each propeller is independently operable;
  (vi) a starboard streamlined double plate rudder and a port streamlined double plate rudder;
  (vii) a port rudder tube connected to the port streamlined double plate rudder, and a starboard rudder tube connected to the starboard streamlined double plate rudder, wherein the each streamlined double plate rudder is configured to be operated independently or operated in tandem;
  (viii) main engines with vibration isolation mounts mounted to minimize engine sound and vibration;
  (ix) fuel tanks mounted in the hull and connected to the main engines;
  (x) a hydraulic bow thruster on the bulbous bow extension, wherein the hydraulic bow thruster is connected to a hydraulic pump for operating the hydraulic bow thruster; and
  (xi) a rudder steering system connected to the main engines for moving the streamlined double plate rudders;
n. two main generators connected in parallel or in series enabling one or both of the main generators to produce power for lighting, heat, air conditioning, other electrical power throughout the floating vessel, and power for a facility or another vessel connected to the floating vessel, wherein each main generator is connected to the fuel tanks;
o. an emergency generator connected to the fuel tanks;
p. a keel cooler for each main engine to enable heat dissipation for each main engine, wherein each keel cooler is fitted to the hull with a plate guard;
q. a pilothouse formed in the topsides comprising:
  (i) a navigation station; and
  (ii) a steering device connected to the streamlined double plate rudders;
r. a dog house on the topside between the pilothouse and the main deck;
s. living quarters in the topside and extending into the hull;
t. communication systems in the pilothouse for providing ship-to-shore communication and ship-to-ship communication;
u. a dynamic positioning processor in communication with the navigation station, the steering device, the propulsion system, the communication systems, and a network, wherein the dynamic positioning processor is configured to continuously position the floating vessel at a latitude and a longitude;
v. anchor lighting on the topsides;
w. navigation lighting on the topsides;
x. an aft deck escape hatch mounted to the topside; and
y. a knuckle boom crane mounted to the topside.

2. The floating vessel of claim 1, wherein the floating vessel has a length ranging from eighty feet to one hundred forty feet, a beam ranging from twenty feet to thirty feet, a draft ranging from seven feet to ten feet, and a gross tonnage less than three hundred tons.

3. The floating vessel of claim 1, further comprising a fill and discharge system for the fuel tanks and oil tanks of the floating vessel.

4. The floating vessel of claim 1, further comprising a potable water system comprising a water maker.

5. The floating vessel of claim 1, further comprising a main fire system comprising: a fire pump and a fire main.

6. The floating vessel of claim 1, further comprising a bilge system comprising a bilge pump configured to operate as a fire pump.

7. The floating vessel of claim 1, further comprising an exhaust systems with isolation mounts.

8. The floating vessel of claim 1, further comprising a focsle deck with an anchor windlass mounted thereto for lowering and raising a Danforth type anchor with a chain.

9. The floating vessel of claim 1, wherein each streamlined double plate rudder is a balanced rudder comprising: a shoe piece supporting structure and a stop to provide structural support and protection to each streamlined double plate rudder.

10. The floating vessel of claim 1, wherein each rudder tube comprises a diameter of no less than three inches and is formed from stainless steel rudderstock.

11. The floating vessel of claim 1, wherein each propeller is a five bladed ice class propeller with a diameter of at least fifty inches and is pitched to match each main engine.

12. The floating vessel of claim 1, further comprising a plurality of manholes disposed through a focsle deck on the floating vessel, and at least three escape scuttles formed in the focsle deck.

13. The floating vessel of claim 1, further comprising at least three gyro type stabilizer units mounted in the hull, wherein each gyro type stabilizer unit comprises a roll chock welded to the hull and extending for at least twenty feet per side of the hull.

14. The floating vessel of claim 1, further comprising from twenty five to thirty five anodes installed on an underwater area of the hull to offset electrolytic action.

15. The floating vessel of claim 1, further comprising a plurality of live wells in the hull, wherein each live well comprises an intake port and a discharge port.

16. The floating vessel of claim 1, further comprising bulwark lockers on main deck.

17. The floating vessel of claim 1, further comprising a rescue/tender vessel on the topsides, and a scuba tank compressor mounted to the hull.

18. The floating vessel of claim 1, wherein the dynamic positioning processor is in communication with a GPS system through the network, and in communication with the thruster steering device, the rudder steering system, the port propeller, the starboard propeller, and the main engines, wherein the dynamic positioning processor is configured to:
  a. position the floating vessel at the latitude and the longitude, and wherein the dynamic positioning processor receives GPS signals transmitted to the floating vessel from the GPS system through the network;
  b. control the streamlined double plate rudders using the rudder steering system;
  c. control the port propeller and the starboard propeller using the main engines through transmissions of the main engines;
  d. control the hydraulic bow thruster using the thruster steering device; and e. control the main engines to maintain a position of the floating vessel within a predetermined area; and f. provide an indication that the floating vessel has left or will leave the predetermined area.

19. The floating vessel of claim 18, wherein the dynamic positioning processor has:

a. computer instructions to control the streamlined double plate rudders, the propellers, the hydraulic bow thruster, and the main engines of the floating vessel to maintain the position of the floating vessel within the predetermined area; and b. computer instructions to monitor the GPS signal associated with the floating vessel and determine whether or not an actual position of the floating vessel is within the predetermined area around the particular latitude and longitude.

* * * * *